United States Patent [19]

Kontz

[11] 4,247,357
[45] Jan. 27, 1981

[54] CONTAINER-BASE ASSEMBLY MACHINE

[75] Inventor: Robert F. Kontz, Toledo, Ohio

[73] Assignee: Owens-Illinois, Inc., Toledo, Ohio

[21] Appl. No.: 68,232

[22] Filed: Aug. 20, 1979

[51] Int. Cl.³ .......................... B65C 9/00; B65C 11/04
[52] U.S. Cl. .................................... 156/567; 156/578
[58] Field of Search ................ 156/566, 567, 556, 578

[56] References Cited

U.S. PATENT DOCUMENTS 4,132,584   1/1979   Aidlin .................................. 156/567

*Primary Examiner*—Douglas J. Drummond
*Attorney, Agent, or Firm*—Charles S. Lynch; Myron E. Click; David H. Wilson

[57] ABSTRACT

This invention provides a machine for assembling cup shaped base members onto the bottom portions of bottle shaped containers. The assembly machine comprises a continuously rotating base transport table receiving successive bases in pockets on its periphery from a supply source of bases. A plurality of vacuum chucks are positioned above the base pockets and successively engage the side walls of containers supplied in timed sequence to such pockets. A plurality of vertically shiftable plungers are mounted above the position of the containers and actuated by a peripheral stationary cam to depress such plungers into engagement with the neck portion of the containers and to push the containers into engagement with the cup shaped bases disposed below the containers. All of the principal rotating elements of the machine are carried by a single rotating column, thereby assuring complete synchronization of all of the functional elements of the machine and permitting the rapid assemblage of the cup shaped bases to the containers because the assembly machine is continuously rotated.

10 Claims, 7 Drawing Figures

CONTAINER-BASE ASSEMBLY MACHINE

BACKGROUND OF THE INVENTION

A number of container designs produced in recent years, particularly containers for pressurized liquids, such as soft drinks or beer, have employed containers having a bottom configuration closely approaching that of a spherical segment. Regardless of whether the container was made of glass or plastic, the spherically shaped bottom portion provided the most efficient design from the standpoint of ability to resist the very high internal pressures developed when the filled container is exposed to elevated temperatures. It is equally desirable that such containers be capable of stable self support, whether they are resting on a conveyor in a filling line or on the table of the ultimate consumer. There has, therefore, developed a number of container designs employing a bottle shaped container having a bottom configuration approaching that of a spherical segment which is inserted in and secured to a cup shaped base member having at least the outer annular rim portion of flat configuration so as to provide stable support for the assembled container.

The development of such combination container designs has concurrently indicated a need for a machine for rapidly and reliably effecting the assemblage of plastic or glass containers into plastic cup shaped base members.

SUMMARY OF THE INVENTION

This invention provides a machine for continuously assembling successive cup shaped base members to the bottom portions of a bottle shaped container. A machine embodying this invention employs continuously rotating tables, one of which receives successive bases in pockets provided on its periphery and the other of which carries a plurality of vacuum chucks on its periphery to engage the side walls of successive containers fed to the machine. A plurality of vertically movable plungers are carried by a third rotary table disposed in overlying relationship to the position of the containers in the vacuum chucks and such plungers are operated by engaging an annular cam to move downwardly into engagement with a container held by the vacuum chuck and effect the downward displacement of such container into snug inserted relationship with a cup shaped base member disposed below the particular container in the pockets of the first mentioned table. All three of the aforementioned tables, constituting the major moving elements of the machine are mounted upon a common support tube or column, which in turn is mounted upon a vertically extending shaft. The shaft carries the annular cam member which effects the downward displacement of the plunger at the proper timed sequence as the containers and bases are moved continuously around a rotational path by the constantly rotating aforementioned tables.

Further objects and advantages of this invention will be apparent to those skilled in the art from the following detailed description, taken in conjunction with the annexed sheets of drawings, on which are shown the preferred embodiments of this invention.

DESCRIPTION OF PREFERRED EMBODIMENT

Figure 1:
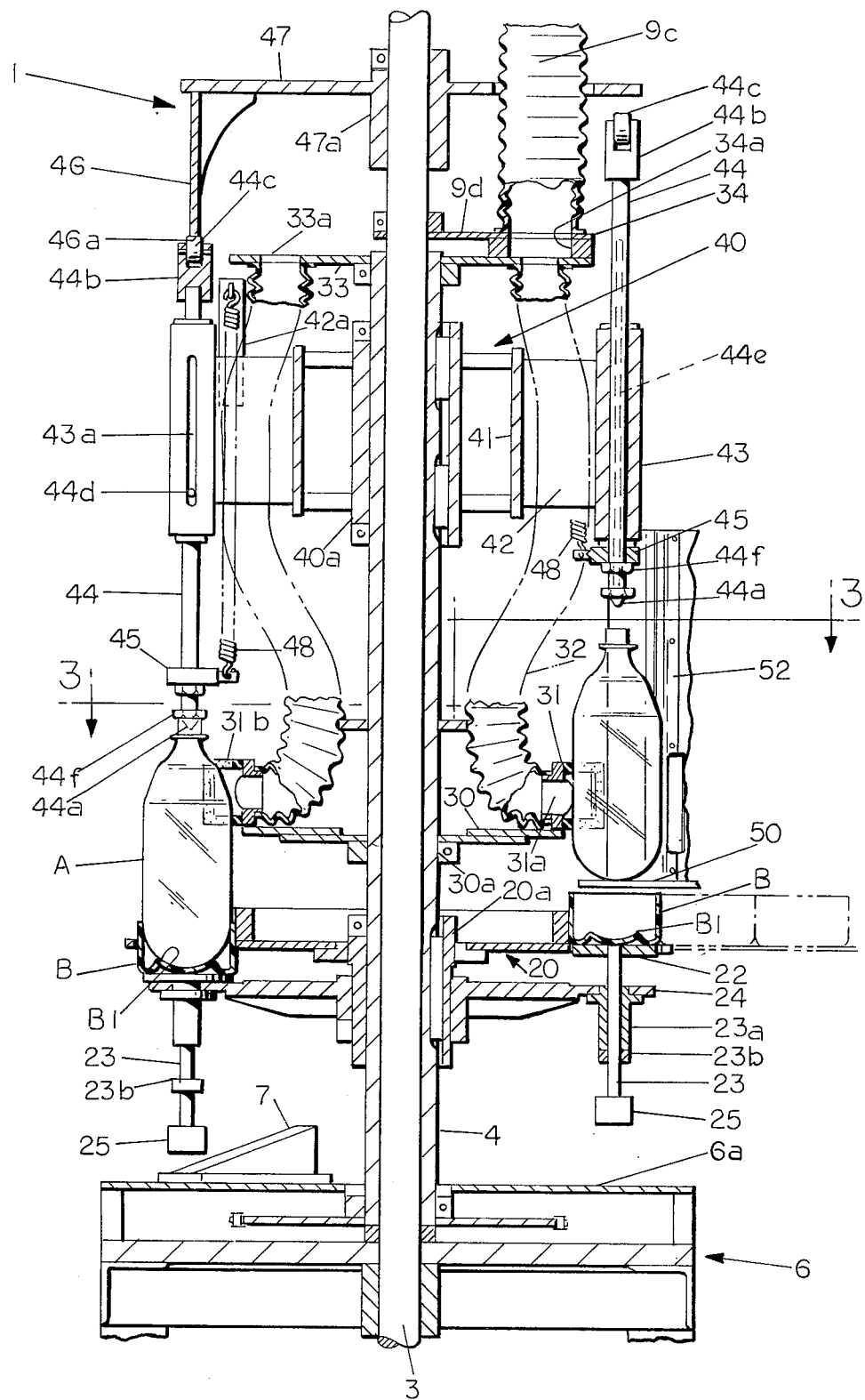
FIG. 1 is a schematic vertical sectional view of a container-cup assembly machine embodying this invention.

To effect the assembly of a container into a cup-shaped base, there obviously must be a continuous supply of containers and bases fed to the assembly machine. The conveying mechanism for supplying the bases to the assembly machine 1 comprises a gravity feed cage structure 10 having a vertical leg portion 10a which is continuously filled with bases supplied from an appropriate source. The vertical leg 10a connects through an arcuate cage section 10b to a horizontal feed-in section 10c overlying a plate 2f which is appropriately supported on two structural frame elements 2a and 2b of the assembly machine 1.

Figure 7:
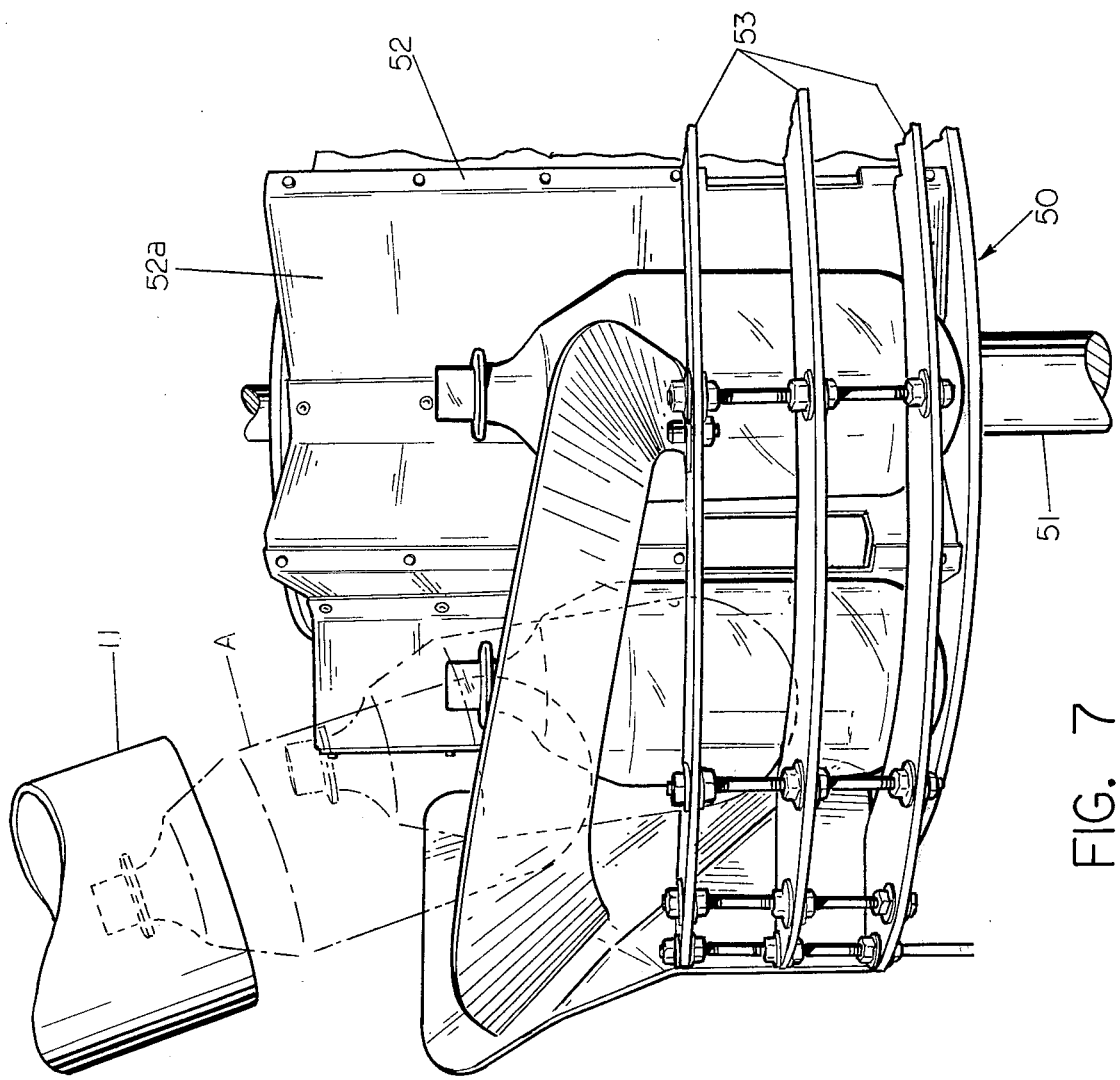
FIG. 7 is a partial perspective view of the container feed table.

The containers A are supplied in timed relationship by a suitable conveyor (not shown) which is driven in synchronism with the assembly machine 1 by a synchronizing drive mechanism described and claimed in my co-pending application Ser. No. 068233, filed concurrently herewith. Each container A is dropped in timed relationship into a sheet metal feed chute 11 (FIG. 7) to land on the periphery of a feed table 50. The mechanism for feeding bases and containers to the machine form no part of the instant invention and, hence, will not be described in any further detail.

Figure 2:
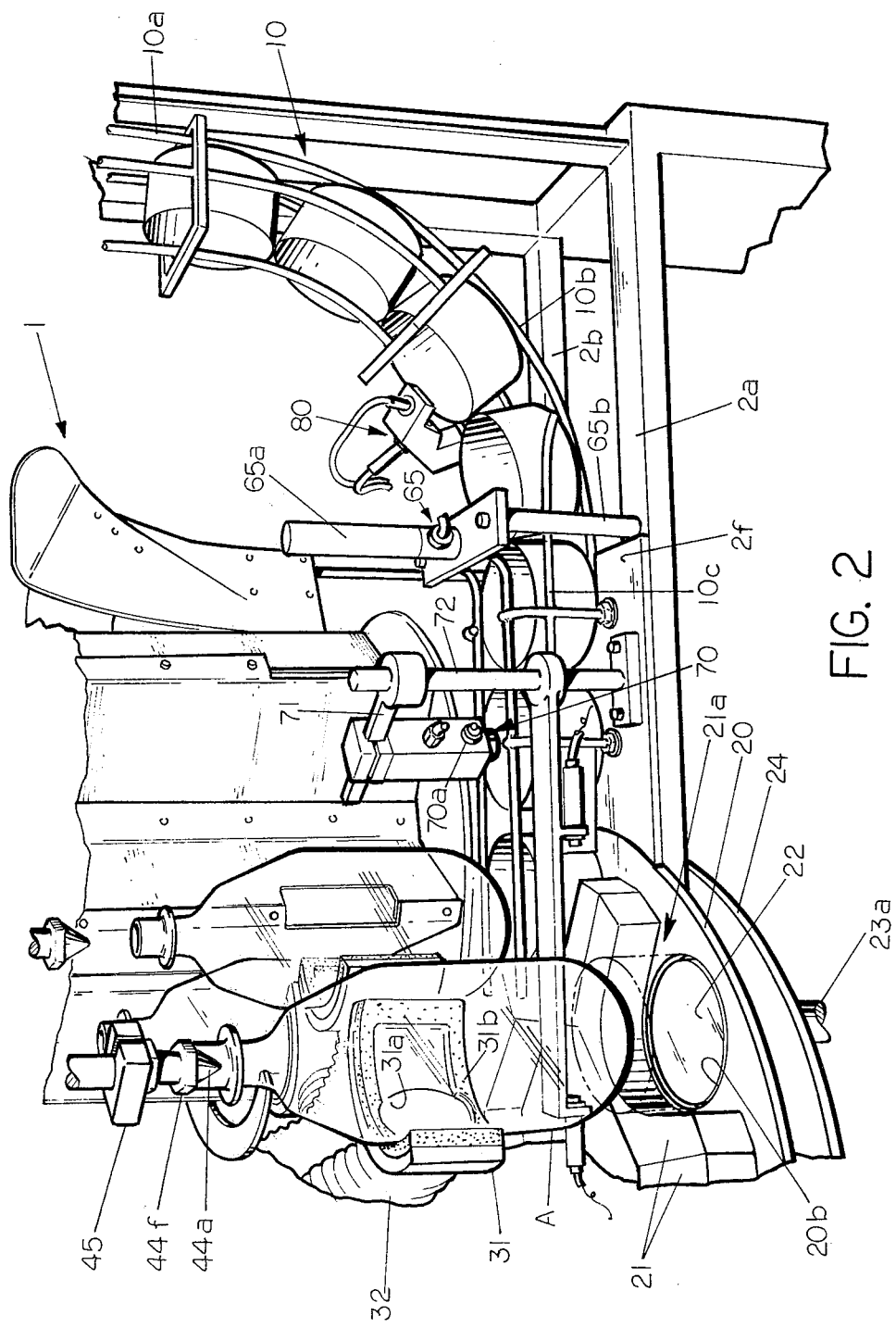
FIG. 2 is a partial perspective view of that portion of the machine wherein the cups are fed into the machine for assembly to the containers.
Figure 3:
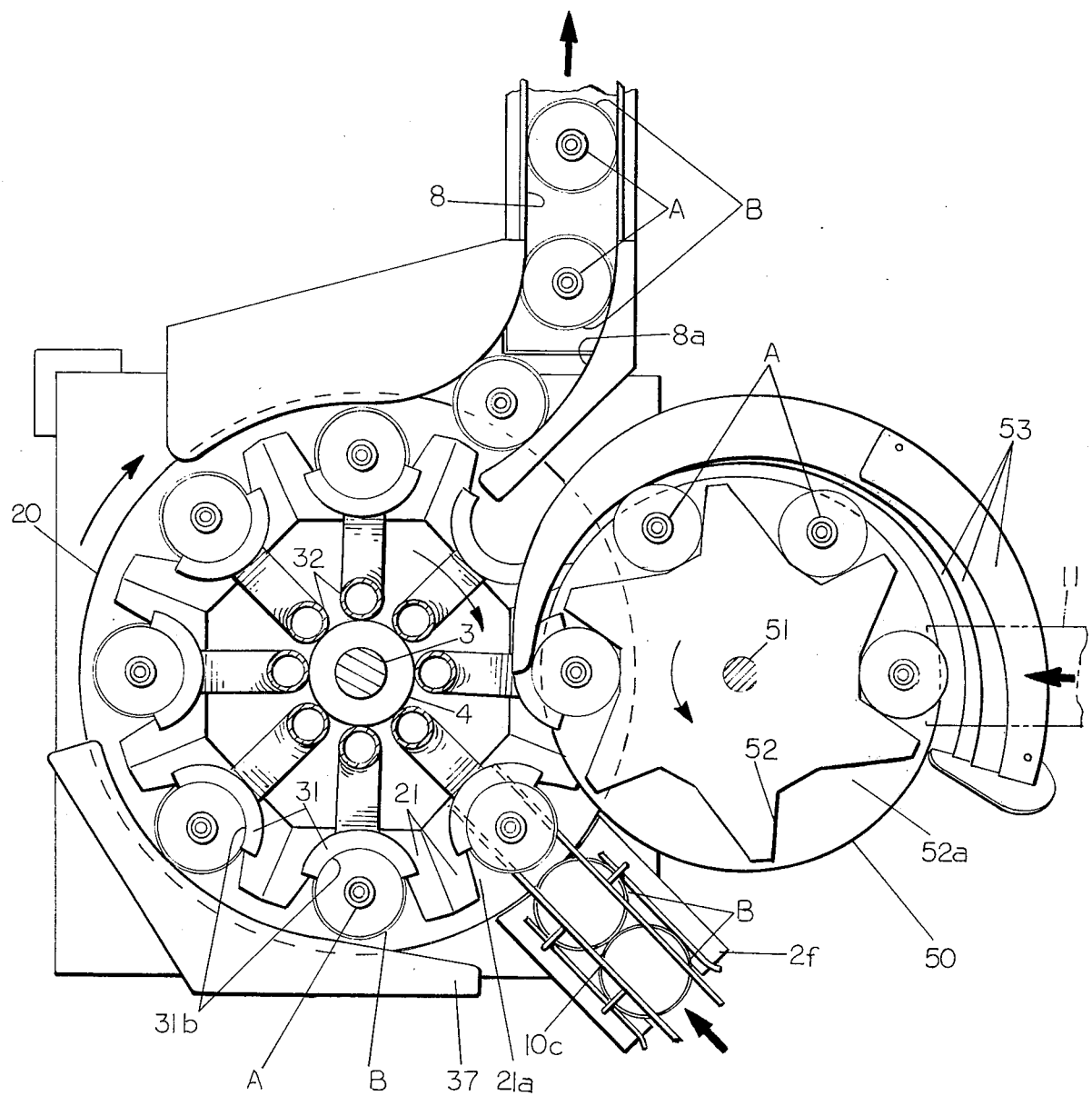
FIG. 3 is a sectional view taken on the multi-plane section 3—3 of FIG. 1.
Figure 4:
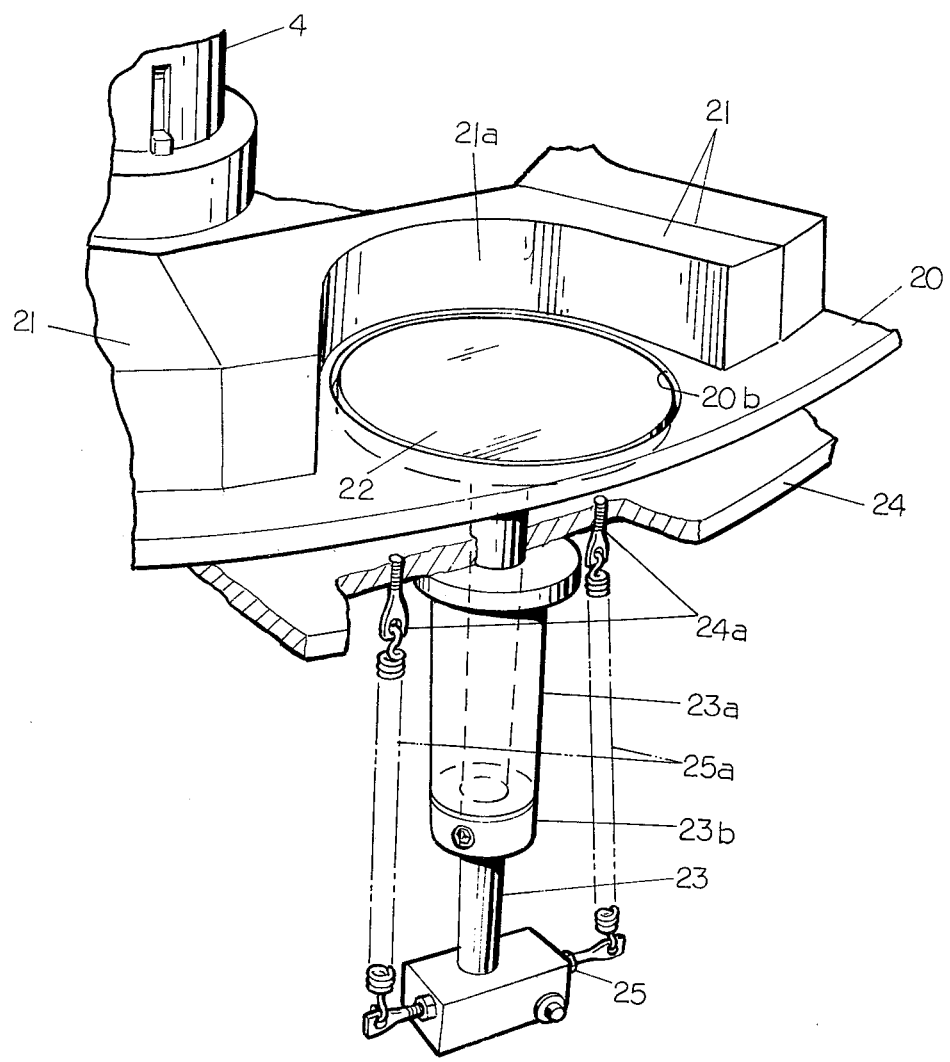
FIG. 4 is a partial perspective view of the cup supporting element provided in each container assembly pocket.

Referring now in particular to FIGS. 1 through 3 of the drawings, the assembly machine 1 comprises a vertical shaft 3 stationarily mounted in an appropriate base structure (not shown). The top end of shaft 3 is anchored in a horizontal cross frame element 2c which is in turn rigidly secured to two upstanding vertical frame members 2d and 2e (see FIG. 6). Shaft 3 journals an elongated tubular support element 4 for rotation about the shaft 3 and the element 4 carries most of the rotating tables of the assembly machine.

A cup transport table 20 is provided defining a plurality of peripherally spaced cup receiving pockets 21a defined by a peripheral array of blocks 21 mounted on the rim of cup transport table 20. Table 20 is secured to support tube 4 by a hub 20a and its top surface is flush with plate 2f. A circular hole 20b is provided in each pocket portion of table 20.

The base portion of each cup receiving pocket 21a is defined by a circular plate 22 which is mounted on the top end of a shaft 23; each shaft 23 is appropriately journalled for vertical sliding movements in a depending bearing sleeve 23a secured to a secondary plate 24 mounted below plate 20 for corotation therewith on the main support tube 4. A locking sleeve 23b secured to shaft 23 functions as a stop for upward movement of the cup supporting plate 22 into flush engagement with the top of the plate supporting table 20. The depressible plate base 22 is resiliently held in this flush position by a pair of springs 25a which connect between a cam block 25 mounted on the extreme bottom end of shaft 23 and anchor bolts 24a provided in the bottom surface of secondary rotating plate 24.

The lower portions of shaft 3 and the rotatable support tube 4 are surrounded by a housing 6 having a top surface 6a. A cam 7 is mounted on the housing top portion 6a and is of an upstanding peripheral segment configuration so as to engage the cam block 25 through only a limited portion of the rotation of the cup supporting rotary table 20. As will be described later, the cam 7 is employed to insure the restoration of the container A with a cup B assembled thereto to a vertical position wherein the base of the assembled container is flush with the top of rotary table 20 so that the assembled containers may be readily removed from the machine by a radial sliding movement.

A container rotating table 30 is provided which is secured by a hub 30a for co-rotation with the main support 4. Table 30 is positioned vertically above the cup supporting table 20 and has a plurality of vacuum chucks 31 mounted around its periphery and adapted to engage and hold the side wall of a container A brought into proximity to the arcuate surfaces 31b of the vacuum chuck 31. Chuck 31 has, of course, a bore 31a communicating with a source of vacuum through a flexible tube 32 extending upwardly toward the inlet manifold 9a of a motor driven air moving fan 9 mounted on frame member 2c.

The vacuum hoses 32 are not continuously connected to the manifold 9a but only during certain angular portions of the rotation of the bottle supporting table 30. Each vacuum hose 32 connects with an aperture 33a in a control plate 33 which is rotatable with the support tube 4. An enlarged diameter hose connection 9c extends downardly from the vacuum pump inlet manifold 9a and has its bottom end secured to a stationary plate 9d mounted on the fixed shaft 3. Plate 9d in turn supports a valve plate 34 which sealingly engages the top rotating surface of the apertured control plate 33.

Figure 6:
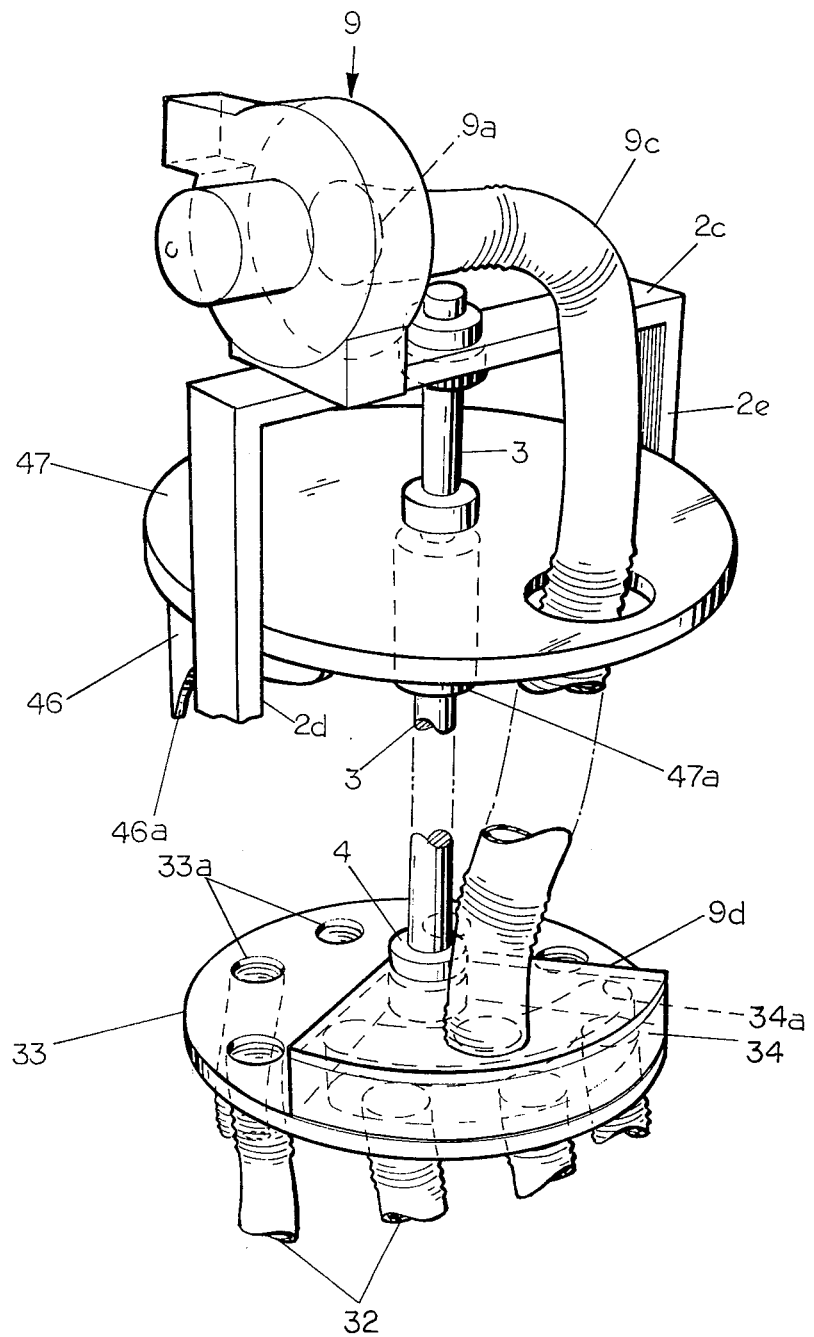
FIG. 6 is a partial perspective view of the top portion of the assembly machine.

As best shown in FIG. 6, valve plate 34 defines an arcuately extending aperture 34a which effectively provides communication between each successive vacuum hose 32 and the main vacuum inlet hose 9c for only a limited angular extent of rotation of the main support tube 4. Hence, the vacuum chucks 31 will be activated only during a portion of the container table 30 rotation around the fixed shaft 3.

As each container A is dropped in timed relationship into the container receiving chute 11, it falls onto a rotary bottle feed table 50 which is supported and driven by a vertical shaft 51 in timed relationship to the rotation of the main support tube 4. An upstanding sheet metal star wheel 52 is appropriately secured on the top surface of table 50 to form appropriate container receiving pockets 52a. A series of vertically spaced, peripherally extending plastic guards 53 are appropriately supported on the frame structure of the machine 1 to insure the retention of the containers A within the pockets defined by the star wheel element 52. The path of the pockets 52a defined by the star wheel 52 tangentially intersectes the path of the container vacuum chucks 31 on table 30 and, at this position, the containers A are respectively snugly engaged by the vacuum chucks 31 and moved tangentially out of the star wheel 52 for movement around the periphery of the machine 1 on the rotating container support table 30.

The actual assembly of each bottle A into a cup B which is positioned vertically beneath bottle A, is accomplished by a rotating container displacement table 40 which is secured by hub 40a for co-rotation with the rotating support tube 4 at a point above the position of the bottle support table 30.

The displacement table 40 essentially comprises an annular central frame element 41 which is secured to a hub 40a and having a plurality of radially extending plates 42 corresponding in number to the number of bottle supporting vacuum chucks 31 and located immediately above the respective vacuum chucks. On the outer end of plates 42, a vertical plunger bearing sleeve 43 is rigidly mounted and provides bearing support for a plunger 44 having a tapered bottom end 44a adapted to enter and snugly engage the neck portion of a container A and a shoulder 44f to abut the neck end. A spring yoke 45 is secured to the bottom end of each plunger 44 immediately above the bottle engaging portion 44a and a tension spring 48 is mounted between such yoke 45 and an upstanding frame member 42a bolted or otherwise rigidly secured to the respective plate portion 42. Plunger 44 is thus resiliently retained in its uppermost position wherein the spring yoke 45 is in abutment with the bottom surface of the plunger bearing 43. If desired, a vertical slot 43a may be provided in each sleeve 43 to cooperate with a hollow radial pin 44d in plunger 44 to prevent relative rotation of plunger 44 and sleeve 43.

A circular segment cam 46 is provided to cooperate with the top end of plunger 44. Each plunger 44 has a pulley mount 44b secured to its top end which rotatably mounts a small pulley 44c. Cam 46 is mounted in depending relationship to a circular flange 47 having a hub portion 47a rigidly secured to the stationary shaft 3. It follows that at appropriate times during the rotation of the main support tube 4, the rollers 44c of each plunger 44 will move into engagement with a bottom cam surface 46a of the cam 46 and the corresponding plunger 44 will be displaced downwardly to bring the tapered bottle neck engaging portion 44a into engagement with the neck of the container A and to then impart a vertical displacement of the container A to achieve the assembly of the container into the cup B which is disposed vertically beneath the particular container.

Figure 5:
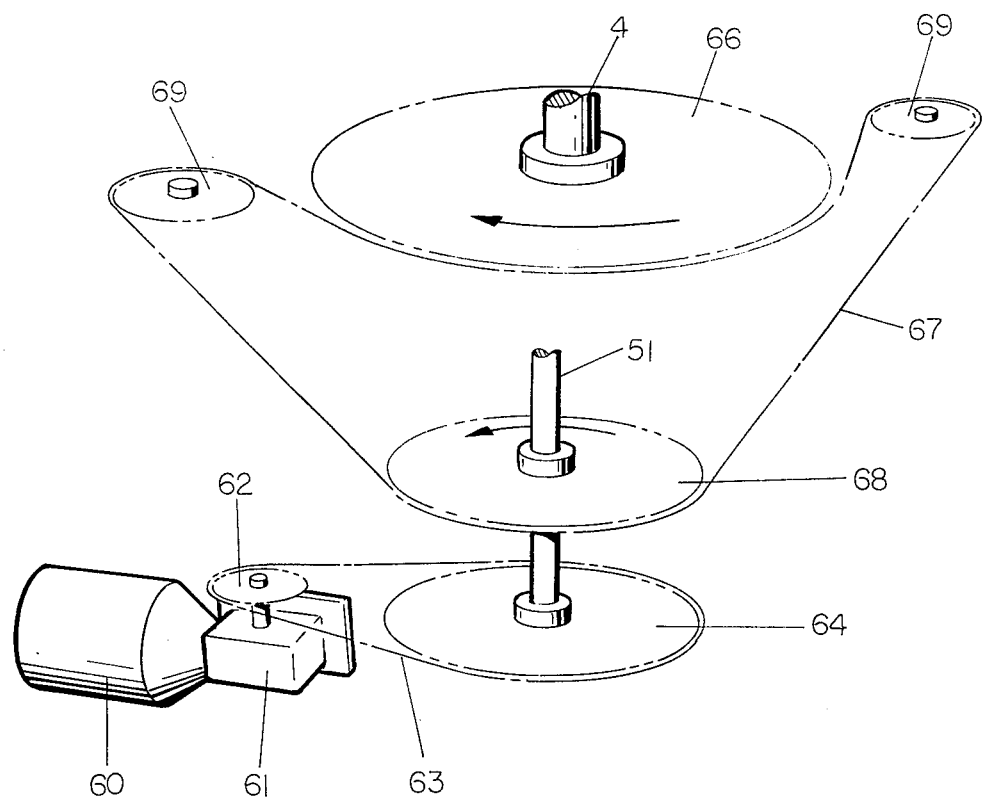
FIG. 5 is a schematic perspective view illustrating the driving mechanism for the primary moving elements of the assembly machine.

To effect the synchronous driving of the star wheel table 50 with the container moving table 30, the mechanism illustrated in FIG. 5 may be conveniently employed. An electric motor 60 drives a pinion 62 through an appropriate gear reduction mechanism 61. Pinion 62 is connected by a chain 63 to a larger pinion 64 mounted on vertical shaft 51 which provides the drive for the star wheel table 50. A pinion 66 is secured to the lower end of the main support tube 4 and is driven in reverse rotation to the shaft 51 by a chain 67 which is entrained around a second pinion 68 mounted on shaft 51, two idler pinions 69 and a portion of the periphery of the pinion 66. It is therefore apparent that all rotary tables of the assembly machine are driven in exact synchronism and there is no opportunity for any of such rotary elements to move in non-synchronized relationship with each other.

The operation of the assembly machine 1 may now be described. Referring to FIG. 3, successive containers A are dropped into the periphery of the star wheel 50 through the chute 11. As previously mentioned, the supply of containers A from an appropriate conveyor (not shown) is synchronized with the operation of the assembly machine 1 so that one of the pockets 52a defined by the star wheel assemblage 50 will be in alignment with the chute 11 as each successive container A is dropped therein. Containers A progress around the periphery of the star wheel assemblage 50 in a counterclockwise rotation as viewed in FIG. 3 and tangentially intersect the peripheral path of the vacuum chucks 31 carried by the container moving table 30. Vacuum is applied to each chuck 31 when it is positioned opposite the star wheel pocket 52a so that the container A is firmly engaged by the chuck 31 and moved in clockwise rotation by the container moving table 30. Since the base of the container A when it is carried by the star wheel assembly 50 is elevated above the cup moving table 20, the vacuum chuck 31 will maintain such vertical relationship of the container A as it moves to the station where the cups B are successively supplied to the cup moving table 20.

The positioning of a cup pocket 21a adjacent the end of the horizontal portion 10c of the cup feeding cage 10 insures that a cup B will be moved by force of the vertical stack of cups B in contact therewith into engagement with the cup receiving pocket 21a and, hence, positioned directly beneath the container A held by the vacuum chuck 31.

Further, clockwise movement of the container moving table 30 moves the successive containers A within the confines of an arcuate segment guide 37, thus assuring that the container A cannot be radially displaced relative to the pockets defined by the respective vacuum chucks 31. In this peripheral area of the machine, the cam roller 44c of the particular container engaging plunger 44 is initially contacted by the rotary cam surface 46a of cam 46 and the tapered head 44a of plunger 44 moves downwardly and inserts itself in the neck of the particular container A. Further, rotational movement of the machine effects a downward displacement of the container A by plunger shoulder 44f into engagement with the side walls of the cup B which is disposed on the cup supporting table 20, immediately beneath the particular container A, thus stressing spring 48.

At this point, the vacuum chuck 31 is no longer needed to provide stability to the location of the container A and the communication between the vacuum hose 32 for the particular vacuum chuck and the vacuum source is interrupted through the simple expedient of the vacuum supply aperture 33a of the particular hose 32 moving out of engagement with arcuate aperature 34a of the valve plate 34. Container A is then forced downwardly still further by the cam 46 operating on the plunger 44 and the cup B is moved vertically downward in a path completely parallel to the movement of the container A by the downward displacement of the circular cup support plate 22 against the bias of the tension springs 25a. As it moves down, the cup B is prevented from any lateral displacements by the side walls of the aperture 20b in the cup supporting table 20.

The downward motion of the particular cup B is limited by the engagment of the cup supporting plate 22 with the top surface of the secondary table 24. It is thereby assured that further downward movement of the container will bring the bottom of the container A firmly into engagement with the bottom portions of the cup B in which it is inserted.

The container A with the cup B assembled thereto has now moved beyond the confines of the segmental guard 37 and the contour of cam surface 46a permits the springs 48 and 25a to return the asembled cup and container to the normal vertical position wherein the base of the cup is flush with the top surface of the cup moving table 20. In the event that cup plate 22 is not returned by springs 25a, cam 7 engages cam block 25 and positively effects the necessary upward movement. The vacuum chuck 31 remains inactivated. The assembly can now be moved into a discharge chute 8 by engaging a stationary deflector guide 8a as table 20 continues to rotate.

The above described apparatus will effect the rapid and accurate assembly of a bottle shaped container into a cup shaped base. The container may be fabricated from glass or plastic, and the base from plastic, metal or paper, but the base is preferably fabricated from a resilient plastic material so that a snug engagement of the walls of the cup shaped base with the inserted bottom portion of the container may be obtained.

To insure the securement of the base on the bottom of the container, it may be desirable to provide an adhesive bond between the cup shaped base B and the bottom of container A. Such bond may be conveniently applied by a conventional adhesive applicating mechanism 70 which is adjustably supported on a radial arm 71 which in turn is adjustably mounted on an upstanding post 72 suitably mounted on machine frame plate 2f adjacent the horizontal portion 10c of the cup conveyor 10. The adhesive applicating mechanism per se forms no part of this invention but is of any conventional type which is supplied with a pressured charge of molten glue through an inlet 70a. A conventional control mechanism (not shown) is provided to trigger the supply of pressured glue to the applicator 70 at the instant that a cup B is positioned directly below such applicator. Applicator 70 may be provided with a nozzle depositing a ring of adhesive on the inner surfaces of the cup B or, in the preferred utilization of this invention, merely directs three peripherally spaced dots of adhesive on an upstanding internal flange B1 (FIG. 1) provided in the base of the cup B.

The presence of caps B in feeding cage 10 may be detected by conventional photocell apparatus.

In the event that a jam-up should occur in the feeding of the cups B into the pockets 21a of the cup rotating table 20, so that no cups were fed onto the periphery of the table, there would be two adverse results. In the first plate, the containers A would be discharged from the machine without a cup assembled thereto. This is not particularity troublesome, for the bottom portions of such containers are sufficiently unstable that they readily fall off of the subsequent conveying mechanism and can be salvaged. More importantly, however, the adhesive applicating mechanism 70 would continue to discharge shots of pressurized glue into the jammed line of cups, and this would create quite a mess. Accordingly, I have found it desirable to provide a photoelectric means 65 for detecting when no cups are supplied to the pockets 21a of the rotating cup table 20. Photo-electric mechanism 65 may coprise a light source 65a which normally directs a light beam across the top portions of the pockets 21a to impinge upon a photocell 65b. Conventional electric circuitry is provided so that if the light beam produced by light source 65a is not interrupted by a cup B passing through the beam, the relay controlling the operation of the adhesive applicator 70 will be de-energized to prevent further applications of glue until the photocell unit 65b again begins indicating that cups are being properly fed onto the rotary cup table 20.

It may also be desirable, in order to insure the continuity of operation of the assembly machine, to interrupt the feeding of the cups onto the cup transport table 20 in the event that a bottle A has, for some reason, not been positioned in a particular vacuum chuck 31. The presence of bottles in the machine is detected by a suitable photocell detecting device (not shown) which may be conveniently mounted on the perimeter of the star wheel 52 which effects the synchronized feeding of the containers A into the rotating vacuum chucks 31. If a container A is missing, the photo-electric detecting mechanism generates a suitable signal, which is applied to a conventional memory circuit to generate a delayed signal to the glue gun.

If desired, a cup orientation detector 80 may be provided which overlies a portion of the transport cage 10 remote from the discharge end of the cage. This conventional photo-electric mechanism is designed to direct light beams relative to the cup shaped bases B in such manner that if a cup is upside down, a signal will be generated which will cause the inverted cup to be removed from the stack of cups and, hence, not produce a jam in the assembly machine.

In the event that the containers A are fabricated from relativey thin-walled plastic material, such that they do not have significant vertical rigidity, it would be desirable to stiffen such containers during the cup insertion operation so as to avoid unnecessary buckling of the side walls of the container. This may be conveniently accomplished by forming the plunger 44 as a hollow tubular member and connecting the interior bore 44e of the plunger 44 with an appropriate source of pressure through the hollow radial pin 44d which rides in the slot 43a. Conventional control mechanism, operated by the angular position of the rotating support column 4 can be utilized to introduce pressured air into the interior of the container A during the interval that the plunger head 44a is in engagement with the neck portion of container A.

Further modifications of this invention will be readily apparent to those skilled in the art and it is intended that the scope of the invention be determined by the appended claims.

What is claimed is:

1. Machine for assembling containers into a cup shaped base comprising, in combination:
   (1) a vertically disposed continuously rotating support column;
   (2) a first table secured to said support column; means on the periphery of said first table defining a plurality of pockets respectively constructed and arranged to receive and move a cup shaped base along a rotary path;
   (3) a second table secured to said support column in overlying relationship to said first table, a plurality of vacuum actuated container grasping chucks peripherally mounted on said second table in vertically aligned relation with said pockets, each chuck being constructed and arranged to grasp the side wall of a container to hold and rotationally move same in vertically spaced, concentric relationship with a base on said first table, but permit axial sliding movement of the grasped container and
   (4) means operable by rotation of said support column for successively moving the chuck held containers respectively axially downwardly into inserted relationship in said cup shaped bases.

2. The machine defined in claim 1 wherein said last mentioned means comprises a circular array of vertically shiftable plungers secured to said rotating column and respectively disposed above said second table and in concentric relationship with said base pockets, and a stationary annular segment cam element successively engaged by said plungers to successively shift the plungers downwardly to engage and shift the containers carried by said second table.

3. A machine in accordance with claims 1 or 2 wherein the peripheral portion of said first rotary table is provided with a series of circular apertures respectively concentrically disposed relative to the pockets and the axis of a grasped bottle and of a size to permit a base to move downwardly into the aperture concentrically with said axis, a bottom plate for each aperture, means for mounting each bottom plate for vertical movements along said axis relative to said first rotary table and means for resiliently holding each bottom plate in flush relationship with said rotary table.

4. A machine for assembling containers into a cup shaped plastic base comprising, in combination:
   (1) a vertically disposed rotating support column;
   (2) a first table secured to said support column, means on the periphery of said first table defining a plurality of pockets respectively constructed and arranged to receive and move a cup shaped base along a rotary path;
   (3) means for successively feeding bases into said pockets without interruption of the rotary movements of said first table;
   (4) a second table secured to said support column in overlying relationship to said first table, a plurality of vacuum actuated container grasping chucks peripherally mounted on said second table in vertically aligned relation respectively with said pockets, each chuck being constructed and arranged to grasp the side wall of a container to hold same in vertically spaced concentric relationship with a base on said first table but permit axial sliding movement of the grasped container;
   (5) means for successively positioning a container adjacent a chuck to be engaged thereby without interruption of the rotary movement of said table,
   (6) means for successively moving the chuck engaged containers downwardly relative to the chuck holding same to insert each container in the underlying base disposed on said first rotary table, and
   (7) means in each said pocket permitting limited downward movement of the inserted base along a path coaxial with the downward movement of the respective container.

5. The machine defined in claim 4 wherein said means for successively moving the chuck held containers comprises a circular array of vertically shiftable plungers secured to said rotating column above said second table and in concentric relationship respectively with said base pockets, and a stationary annular segment cam element successively engaged by said plungers to successively shift the plungers downwardly to engage and shift the containers carried by said second table.

6. A machine in accordance with claim 4 wherein said last mentioned means comprises a series of circular apertures in the peripheral portion of said first rotary table. each aperture being concentrically disposed relative to the axis of the respective grasped container and being of a diameter to permit a base to move downwardly into the aperture by concentric movement along said axis, a bottom plate for each said aperture, means for mounting each bottom plate for limited vertical movements along said axis relative to said first table and means for resiliently holding each bottom plate in flush relationship with said rotary table.

7. A machine as claimed in claim 4 plus means for detecting the absence of a container in a chuck, and means responsive to said detecting means for interrupting the feeding of bases to the machine so that no base is fed to the pocket underlying the empty chuck.

8. A machine as claimed in claim 1 or 4 plus valve means for applying vacuum to the vacuum actuated chucks only during a portion of the rotational cycle of said second table, said valve means including a plate element movable with said support column.

9. The machine defined in claims 1 or 5 plus means for applying pressurized air to the interior of the container during the downward insertion of the container into said cup shaped base.

10. The machine defined in claims 2 or 5 wherein each of said vertically shiftable plungers has a hollow bore communicating with the interior of an engaged container, and means for supplying pressurized air to the interior of an engaged container through said plunger bore.

* * * * *

UNITED STATES PATENT AND TRADEMARK OFFICE
CERTIFICATE OF CORRECTION

PATENT NO. : 4,247,357
DATED : January 27, 1981
INVENTOR(S) : Robert F. Kontz

It is certified that error appears in the above-identified patent and that said Letters Patent are hereby corrected as shown below:

Col. 6, line 50, "plate" should be --place--

Col. 6, line 52, "particularity" should be -- particularily --.

Col. 6, line 62, "coprise" should be --comprise--

Signed and Sealed this

Seventh Day of December 1982

[SEAL]

Attest:

Attesting Officer

GERALD J. MOSSINGHOFF

Commissioner of Patents and Trademarks